United States Patent
Ho et al.

(10) Patent No.: US 11,644,972 B2
(45) Date of Patent: May 9, 2023

(54) VIRTUAL IMAGE DISPLAY DEVICE AND SETTING METHOD FOR INPUT INTERFACE THEREOF

(71) Applicant: HTC Corporation, Taoyuan (TW)

(72) Inventors: Chia-Chu Ho, Taoyuan (TW); Ching-Hao Lee, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/567,885

(22) Filed: Jan. 4, 2022

(65) Prior Publication Data

US 2023/0093811 A1 Mar. 30, 2023

Related U.S. Application Data

(60) Provisional application No. 63/247,805, filed on Sep. 24, 2021.

(51) Int. Cl.
*G06F 3/04886* (2022.01)
*G02B 27/01* (2006.01)

(52) U.S. Cl.
CPC ..... *G06F 3/04886* (2013.01); *G02B 27/0172* (2013.01); *G02B 2027/014* (2013.01)

(58) Field of Classification Search
CPC ............... G06F 3/0488; G06F 3/0412; G06F 3/04186; G06F 3/0484; G06F 2203/04803; G06F 1/1652; G06F 1/263; G06F 1/28; G06F 1/329; G06F 3/04847; G06F 3/14; G06F 1/3262; G06F 2203/04104; G06F 3/0418; G06F 3/0446; G06F 3/045;

(Continued)

(56) References Cited

U.S. PATENT DOCUMENTS

2006/0026535 A1* 2/2006 Hotelling .............. G06F 3/0488
715/863
2006/0161871 A1* 7/2006 Hotelling .............. G06F 3/0485
715/862

(Continued)

FOREIGN PATENT DOCUMENTS

| TW | 201915694 | 4/2019 |
|----|-----------|--------|
| TW | 202105133 | 2/2021 |
| WO | 2021104015 | 6/2021 |

OTHER PUBLICATIONS

"Search Report of Europe Counterpart Application", dated Dec. 22, 2022, pp. 1-4.
"Office Action of Taiwan Counterpart Application", dated Feb. 21, 2023, p. 1-p. 6.

*Primary Examiner* — Rayeez R Chowdhury
(74) *Attorney, Agent, or Firm* — JCIPRNET

(57) ABSTRACT

A virtual image display device and a setting method for an input interface are provided. The virtual image display device includes a virtual image display and a handheld electronic device. The virtual image display executes an application to provide multiple prompt commands to perform a setting action of the input interface. The handheld electronic device displays the input interface and receives multiple input touch actions corresponding to each of the prompt commands through the input interface in the setting action. The virtual image display calculates multiple effective touch areas respectively corresponding to the prompt commands according to a position distribution of each input touch action corresponding to each of the prompt commands.

10 Claims, 5 Drawing Sheets

(58) Field of Classification Search
CPC ............... G06F 3/0481; G06F 3/04886; G06F
1/3203; G06F 21/36; G06F 2203/04112;
G06F 3/011; G06F 3/017; G06F 3/0346;
G06F 3/04883; G06F 1/163; G06F 3/013;
G06F 3/016; G06F 3/0482; G06F 1/1601;
G06F 1/206; G06F 16/4393; G06F
3/04817; G06F 3/04842; G06F 9/451;
G06F 1/1632; G06F 1/166; G06F 16/54;
G06F 16/954; G06F 2203/013; G06F
2203/04101; G06F 3/012; G06F 3/014;
G06F 3/0233; G06F 3/0236; G06F
3/0238; G06F 3/0304; G06F 3/041; G06F
3/0425; G06F 3/048; G06F 3/04815;
G06F 3/04845; G06F 3/0485; G06F
3/1423; G06F 3/1454
See application file for complete search history.

(56) References Cited

U.S. PATENT DOCUMENTS

| | | | |
|---|---|---|---|
| 2014/0298266 A1* | 10/2014 | Lapp | G06F 3/04886 715/835 |
| 2015/0007100 A1* | 1/2015 | Wang | G06F 3/017 715/783 |
| 2015/0199069 A1* | 7/2015 | Chiu | G06F 3/0418 345/178 |
| 2016/0132139 A1* | 5/2016 | Du | G06F 3/0414 345/173 |
| 2017/0075566 A1 | 3/2017 | Park et al. | |
| 2017/0220135 A1* | 8/2017 | Abe | G06F 3/0416 |
| 2018/0239417 A1 | 8/2018 | Fu | |
| 2019/0114075 A1* | 4/2019 | Jung | G06F 3/04842 |
| 2022/0291829 A1* | 9/2022 | Kim | G06F 3/0484 |

* cited by examiner

VIRTUAL IMAGE DISPLAY DEVICE AND SETTING METHOD FOR INPUT INTERFACE THEREOF

CROSS-REFERENCE TO RELATED APPLICATION

This application claims the priority benefit of U.S. provisional application Ser. No. 63/247,805, filed on Sep. 24, 2021. The entirety of the above-mentioned patent application is hereby incorporated by reference herein and made a part of this specification.

BACKGROUND

Technical Field

The disclosure relates to a virtual image display device and a setting method for an input interface thereof, and more particularly, to a virtual image display device and a setting method for an input interface thereof that can set touch areas for individual users.

Description of Related Art

When using a virtual image display device, a user can perform a touch action through an input interface displayed on the handheld electronic device, and use it to operate the virtual image display device. However, while experiencing the virtual reality, the user cannot see the input interface displayed by the handheld electronic device at the same time. In addition, since each user has different finger lengths, palm sizes and personal usage habits, when performing touch actions on the input interface, he or she may often touch an incorrect touch area.

SUMMARY

The disclosure provides a virtual image display device and a setting method for an input interface thereof, which may improve the convenience of a user's touch operation.

A virtual image display device of the disclosure includes a virtual image display and a handheld electronic device. The virtual image display executes an application to provide multiple prompt commands to perform a setting action of an input interface. The handheld electronic device displays the input interface and receives multiple input touch actions corresponding to each of the prompt commands through the input interface in the setting action. The virtual image display calculates multiple effective touch areas respectively corresponding to the prompt commands according to a position distribution of the input touch actions corresponding to each of the prompt commands.

A setting method for an input interface of a virtual image display device of the disclosure includes: executing an application by a virtual image display to provide multiple prompt commands to perform a setting action of the input interface; displaying the input interface by a handheld electronic device and receiving multiple input touch actions corresponding to each of the prompt commands through the input interface in the setting action; and calculating multiple effective touch areas respectively corresponding to the prompt commands according to a position distribution of the input touch actions corresponding to each of the prompt commands.

Based on the above, in the setting method for the input interface of the virtual image display device of the disclosure, by receiving the positions of the touch actions performed by the user corresponding to different prompt commands in the setting action and analyzing the positions of the touch actions, the effective touch areas suitable for the lengths of the user's fingers are calculated. In this way, the input interface provided by the handheld electronic device may be more suitable for any user, thereby improving the convenience of operation and the comfort in use of the virtual image display device.

DESCRIPTION OF EMBODIMENTS

Figure 1:
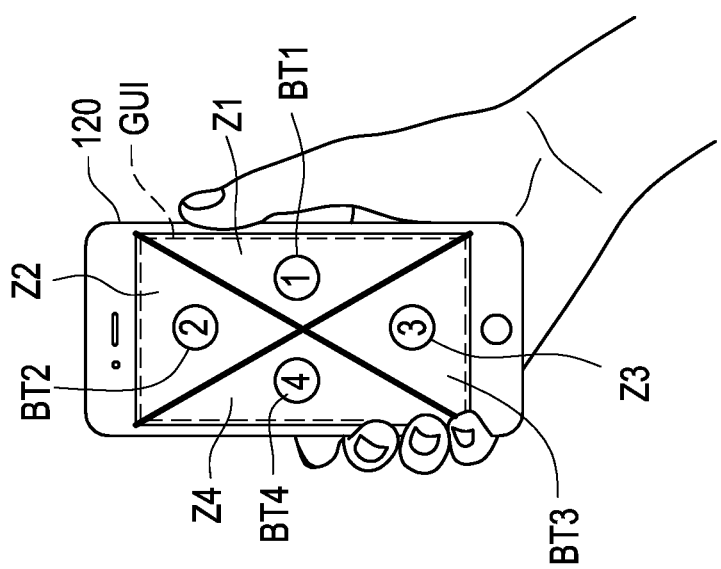
FIG. 1 is a schematic diagram of a virtual image display device according to an embodiment of the disclosure.
Figure 1:
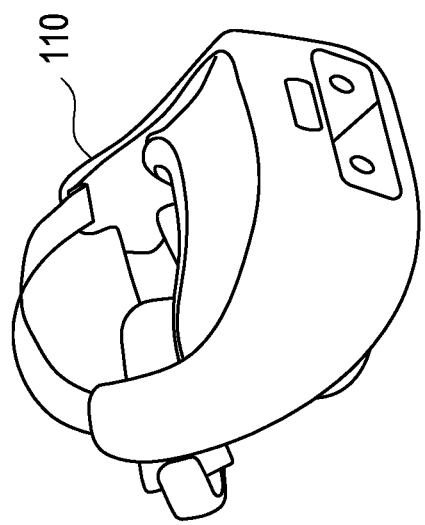

Please refer to FIG. 1. FIG. 1 is a schematic diagram of a virtual image display device according to an embodiment of the disclosure. In FIG. 1, the virtual image display 100 device includes a virtual image display 110 and a handheld electronic device 120. The virtual image display 110 may be a head-mounted display. The handheld electronic device 120 may be a smart mobile phone. The handheld electronic device 120 may display an input interface GUI for the user to perform a touch action on the input interface GUI to operate the virtual image display 110.

Since the length of each user's finger is different, without watching the display screen of the handheld electronic device 120, the input touch actions performed by the user may not effectively occur in the preset initial touch areas. Therefore, the virtual image display device 100 needs to set the positions of multiple touch areas on the input interface GUI for each user.

The virtual image display 110 may execute an application to perform a setting action of the input interface GUI displayed by the handheld electronic device 120. In the setting action, the virtual image display 110 may provide multiple prompt commands to the user according to the application, and require the user to perform input touch actions on the input interface GUI displayed on the handheld electronic device 120 according to the prompt commands. The prompt commands may be an image signal and/or a sound signal generated by the virtual image display 110.

Figure 2:
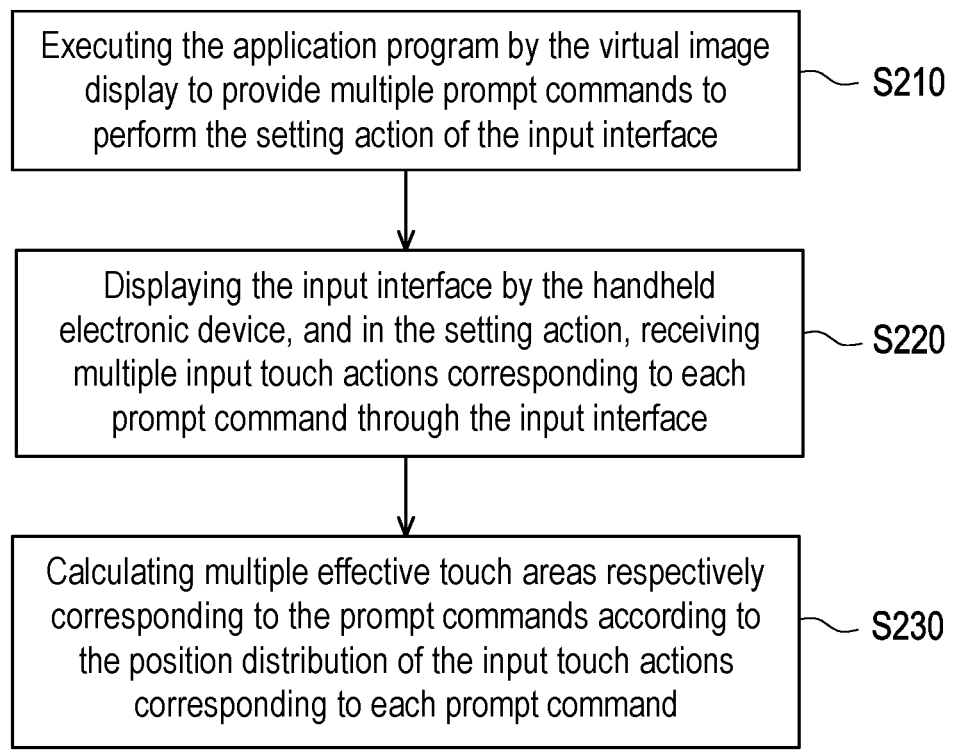
FIG. 2 is a flowchart illustrating a setting method for an input interface of a virtual image display device according to an embodiment of the disclosure.

In this embodiment, the input interface GUI displayed by the handheld electronic device 120 has touch areas Z1 to Z4 corresponding to virtual keys BT1 to BT4, respectively. The virtual image display 110 may execute the application to perform the setting action of the input interface GUI. In the setting action, please refer to FIG. 2 as well. FIG. 2 is a flowchart illustrating a setting method for an input interface of a virtual image display device according to an embodiment of the disclosure. In step S210, the virtual image display 110 may execute the application to provide multiple prompt commands to perform the setting action of the input interface. In step S220, the handheld electronic device 120 is configured to display the input interface, and in the setting action, the virtual image display 110 instructs the user to perform input touch actions on one of the virtual keys BT1 to BT4, and the handheld electronic device 120 receives the input touch actions performed by the user through the input interface corresponding to each of the prompt commands. Correspondingly, the virtual image display 110 may record the positions of the input touch actions corresponding to each of the prompt commands.

In detail, the user may perform multiple input touch actions on the virtual key BT1 according to a first prompt command provided by the virtual image display 110; may perform multiple input touch actions on the virtual key BT2 according to a second prompt command provided by the virtual image display 110; may perform multiple input touch actions on the virtual key BT3 according to a third prompt command provided by the virtual image display 110; and may perform multiple input touch actions on the virtual key BT4 according to a fourth prompt command provided by the virtual image display 110.

After multiple prompt commands are issued, in step S230, the virtual image display 110 may analyze the positions of the input touch actions performed by the user on each of the virtual keys BT1 to BT4, and calculate the position distributions of the user's input touch actions corresponding to various prompt commands. The virtual image display 110 may then calculate multiple effective touch areas corresponding to the prompt commands according to the position distributions.

The virtual image display 110 causes the handheld electronic device 120 to perform the display operation of the input interface GUI according to the updated effective touch areas.

In addition, the above-mentioned setting action of the input interface may be customized for each user. The virtual image display 110 may store the user's identification information corresponding to the setting result. When the user operates the virtual image display device 100, the user only needs to input the identification information, and the virtual image display 110 may display the input interface GUI suitable for the user's operation on the handheld electronic device 120, which effectively improves the convenience in use.

Figure 3A:
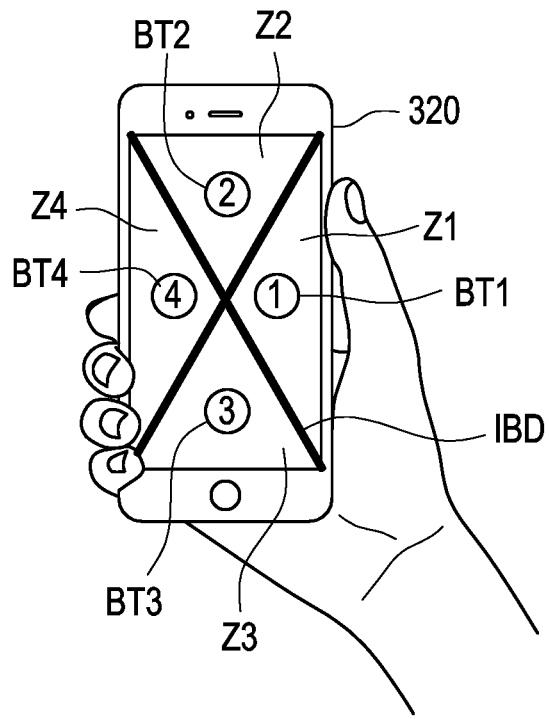
FIGS. 3A to 3D are schematic diagrams illustrating operations of a setting method for an input interface of a virtual image display device according to an embodiment of the disclosure.

Please refer to FIGS. 3A to 3D for the following description. FIGS. 3A to 3D are schematic diagrams illustrating operations of a setting method for an input interface of a virtual image display device according to an embodiment of the disclosure. In FIG. 3A, the virtual image display executes the application to cause a handheld electronic device 320 to display an input interface. The input interface may have multiple initial touch areas Z1 to Z4 corresponding to the virtual keys BT1 to BT4, and an initial boundary IBD configured to separate the initial touch areas Z1 to Z4.

Figure 3B:
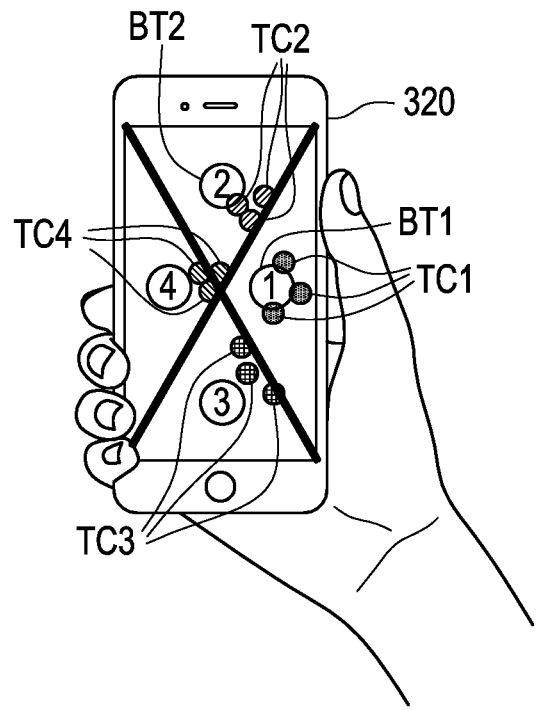

In FIG. 3B, the virtual image display provides multiple prompt commands, and instructs the user to perform multiple input touch actions on each of the initial touch areas Z1 to Z4 on the input interface, and generates multiple touch points TC1 to TC4, respectively. The touch points TC1 correspond to the prompt command for inputting touch actions for the virtual key BT1; the touch points TC2 correspond to the prompt command for inputting touch actions for the virtual key BT2; the touch points TC3 correspond to the prompt command for inputting touch actions for the virtual key BT3; the touch points TC4 correspond to the prompt command for inputting touch actions for the virtual key BT4.

The virtual image display records the positions of the touch points TC1 to TC4, and analyzes the distribution range of the positions of the touch points TC1, the distribution range of the positions of the touch points TC2, the distribution range of the positions of the touch points TC3, and the distribution range of the positions of the touch points TC4.

Figure 3C:
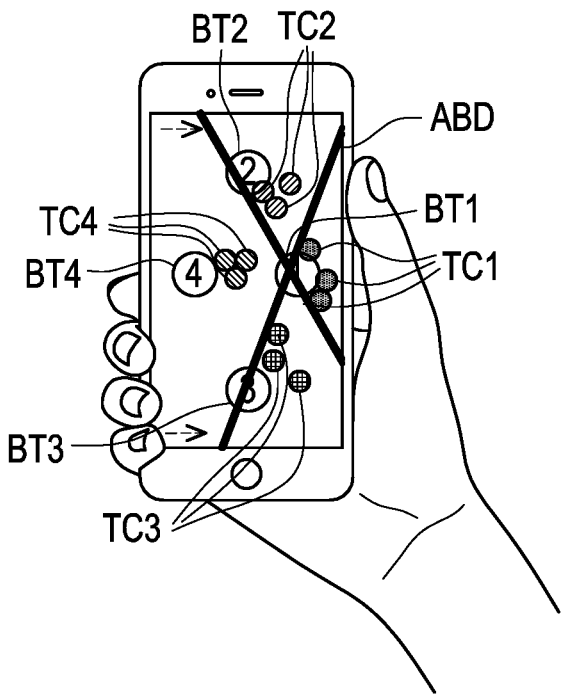
Figure 3D:
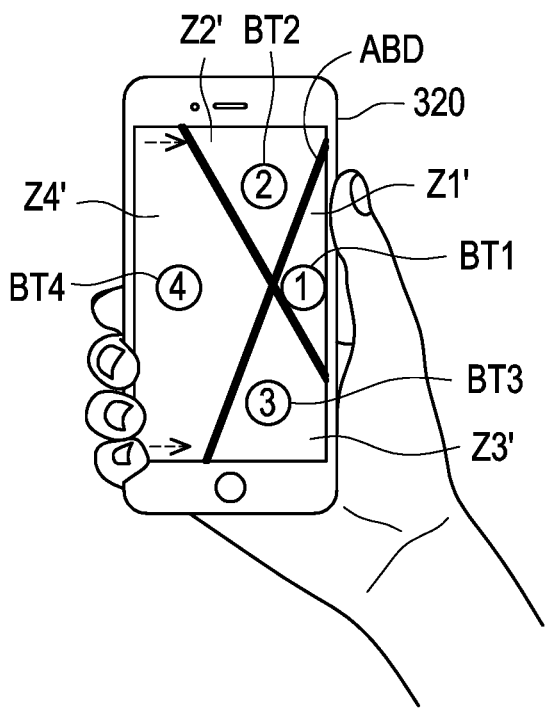

Next, in FIG. 3C, the virtual image display may generate an updated boundary ABD according to the distribution ranges of the positions of the touch points TC1 to TC4, and regenerate effective touch areas Z1' to Z4' corresponding to the virtual keys BT1 to BT4 through the updated boundary ABD, as shown in FIG. 3D.

In this embodiment, the virtual image display may calculate a first center position of the multiple touch points TC1, a second center position of the multiple touch points TC2, a third center position of the multiple touch points TC3, and a fourth center position of the multiple touch points TC4. Then the updated boundary ABD is calculated according to the first center position to the fourth center position. The newly generated effective touch areas Z1' to Z4' may respectively include the positions where the touch points TC1 to TC4 occur according to the updated boundary ABD.

Further, in the embodiment of the disclosure, setting the four virtual keys BT1 to BT4 is only an example for illustration. In other embodiments of the disclosure, the input interface on the handheld electronic device may have different numbers of virtual keys and different numbers of touch areas. In addition, the distribution pattern of the touch areas is not limited to the pattern shown in FIG. 3A, and the designer may design the layout of the touch areas according to actual needs, and there is no limitation in this regard.

Figure 4:
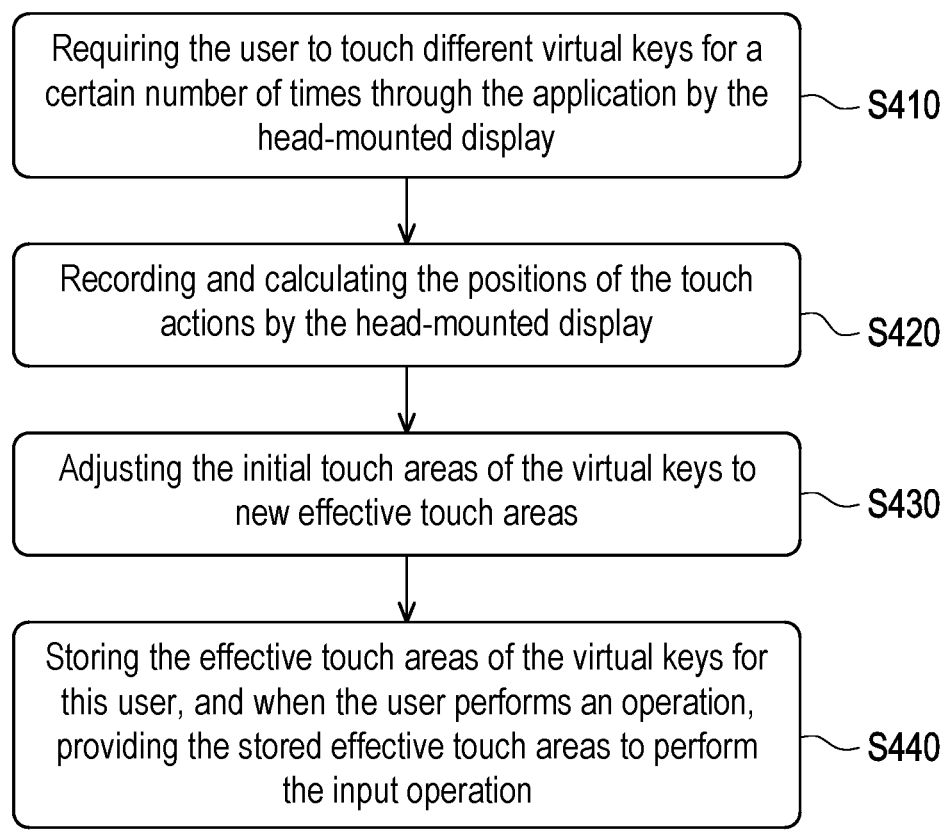
FIG. 4 is a flowchart illustrating a setting method for an input interface of a virtual image display device according to an embodiment of the disclosure.

Please refer to FIG. 4 for the following description. FIG. 4 is a flowchart illustrating a setting method for an input interface of a virtual image display device according to an embodiment of the disclosure. In step S410, a head-mounted display as the virtual image display requires the user to touch different virtual keys for a certain number of times through the application. In step S420, the head-mounted display records and calculates the positions of the touch actions. In step S430, the head-mounted display adjusts the initial touch areas of the virtual keys to new effective touch areas, and in step S440, the head-mounted display may store the effective touch areas of the virtual keys for this user, and when the user performs an operation, the stored effective touch areas are provided for the input operation.

The details of the above steps have been described in detail in the foregoing embodiments, and will not be repeated here.

To sum up, the virtual image display of the disclosure executes an application to collect multiple touch positions corresponding to each of the virtual keys when individual users perform touch actions on the virtual keys, and generates effective touch areas corresponding to individual users according to the position information of the collected touch actions. In this way, each user may simply touch the virtual keys through the input interface provided by the handheld electronic device when experiencing the virtual reality or augmented reality images, which effectively improves the comfort of use and enhance the user experience.

What is claimed is:

1. A virtual image display device, comprising:
   a virtual image display which executes an application to provide a plurality of prompt commands to perform a setting action of an input interface; and
   a handheld electronic device which displays the input interface and receives a plurality of input touch actions corresponding to each of the prompt commands through the input interface to generate a plurality of first touch points in a first initial touch area and generate a plurality of second touch points in a second initial touch area in the setting action,
wherein the virtual image display analyzes a first distribution range of the plurality of first touch points and a second distribution range of the plurality of second touch points, generates a boundary according to the first distribution range and the second distribution range, and generates a plurality of effective touch areas respectively according to the boundary.

2. The virtual image display device according to claim 1, wherein the virtual image display executes the application to cause the handheld electronic device to display the input interface, wherein the input interface comprises a plurality of initial touch areas.

3. The virtual image display device according to claim 2, wherein the virtual image display executes the application to provide the prompt commands, and each of the prompt commands is configured to prompt a user to perform each of the input touch actions on one of the initial touch areas.

4. The virtual image display device according to claim 1, wherein the virtual image display calculates the position distribution of the input touch actions corresponding to each of the prompt commands to set the boundary between the effective touch areas.

5. The virtual image display device according to claim 1, wherein the virtual image display updates the input interface displayed by the handheld electronic device according to the effective touch areas.

6. A setting method for an input interface of a virtual image display device, comprising:
 executing an application by a virtual image display to provide a plurality of prompt commands to perform a setting action of the input interface;
 displaying the input interface by a handheld electronic device and receiving a plurality of input touch actions corresponding to each of the prompt commands through the input interface to generate a plurality of first touch points in a first initial touch area and generate a plurality of second touch points in a second initial touch area in the setting action;
 analyzing a first distribution range of the plurality of first touch points and a second distribution range of the plurality of second touch points;
 generating a boundary according to the first distribution range and the second distribution range; and
 generating a plurality of effective touch areas respectively according to the boundary.

7. The setting method according to claim 6, wherein displaying the input interface by the handheld electronic device and receiving the input touch actions corresponding to each of the prompt commands through the input interface in the setting action comprises:
 executing the application by the virtual image display to cause the handheld electronic device to display the input interface, wherein the input interface comprises a plurality of initial touch areas.

8. The setting method according to claim 7, wherein displaying the input interface by the handheld electronic device and receiving the input touch actions corresponding to each of the prompt commands through the input interface in the setting action further comprises:
 executing the application by the virtual image display to provide the prompt commands, and prompting a user to perform each of the input touch actions on one of the initial touch areas through each of the prompt commands.

9. The setting method according to claim 6, further comprising:
 calculating a position distribution of the input touch actions corresponding to each of the prompt commands by the virtual image display to set the boundary between the effective touch areas.

10. The setting method according to claim 6, further comprising:
 updating the input interface displayed by the handheld electronic device according to the effective touch areas by the virtual image display.

* * * * *